United States Patent
Baker

[11] Patent Number: 5,594,630
[45] Date of Patent: Jan. 14, 1997

[54] ADD-ON DISTORTION SCRUBBER FOR AC POWER SYSTEMS

[75] Inventor: Donal E. Baker, Rockford, Ill.

[73] Assignee: Sundstrand Corporation, Rockford, Ill.

[21] Appl. No.: 495,161

[22] Filed: Jun. 27, 1995

[51] Int. Cl.$^6$ ............................................. H02M 1/12
[52] U.S. Cl. ................................. 363/40; 307/105
[58] Field of Search .......................... 363/39, 40, 42, 363/43, 71, 72; 323/361, 207; 307/105; 327/551, 553

[56] References Cited

U.S. PATENT DOCUMENTS

| | | | |
|---|---|---|---|
| 5,343,079 | 8/1994 | Mohan et al. | 307/105 |
| 5,349,517 | 9/1994 | Brennen | 363/40 |
| 5,384,696 | 1/1995 | Moran et al. | 363/40 |
| 5,397,927 | 3/1995 | Suelzle et al. | 307/105 |
| 5,446,642 | 8/1995 | McMurray | 363/40 |
| 5,469,044 | 11/1995 | Gyugyi et al. | 323/207 |
| 5,499,178 | 3/1996 | Mohan | 363/39 |

*Primary Examiner*—Matthew V. Nguyen
*Assistant Examiner*—Adolf Berhane
*Attorney, Agent, or Firm*—Jeffery J. Makeever

[57] ABSTRACT

An add-on distortion scrubber for use in an AC power generation system comprises an parallel connected inverter having a first DC link capacitor coupled in parallel, and a series connected inductive tie impedance. The inverter produces an output voltage having controllable magnitude, phase, and frequency components and operates by sensing the AC voltage waveform of the AC power generation system and controlling its output magnitude, phase, and frequency to fundamentally match the AC voltage waveform. In this way, the inverter appears as a virtual no-load to the AC power generation system while removing the harmonics therefrom. Alternatively, the scrubber inverter may be configured as a dedicated load filter by coupling it to the power input of the load. The scrubber inverter senses the total power delivered to the load/scrubber combination and generates an appropriate waveform to cancel the harmonics generated by the load. In a further embodiment, with a controlled relationship of the inductive tie impedance, the add-on distortion scrubber is utilized with a main power inverter operating in a full square wave mode to produce a sinusoidal output. The output of the main power inverter is coupled through an output inductance and a parallel filter capacitor to a parallel connected inductive tie impedance of the add-on distortion scrubber. The scrubber inverter compensates for the harmonics generated by the main inverter and provides a clean output without heavy filter components.

17 Claims, 7 Drawing Sheets

5,594,630

ADD-ON DISTORTION SCRUBBER FOR AC POWER SYSTEMS

FIELD OF THE INVENTION

The instant invention relates generally to distortion filtering in power distribution systems, and more particularly to electronic harmonic distortion scrubbing inverters for use therein.

BACKGROUND ART

With advancing technology comes the increased use of non-linear loads on electrical power distribution systems. This, in turn, results in unwanted distortion of the system voltage, i.e. poor power quality. Both airborne and ground based power systems are victims of this trend. The task of specifying input current characteristics for these loads to eliminate the problem becomes a formidable, if not impossible, task.

An alternate solution is to connect a separate electronic box(es) to locally correct the voltage distortion on the system regardless of the source of the problem. In this manner a power system designer can optimize the system in terms of cost, weight, performance and schedule without imposing on the designer of every piece of user equipment connected to the power distribution grid. Historically, this would be accomplished by adding a capacitor to the power grid to act as a local filter. This approach carries with it a reactive (leading power factor) current which can create other problems such as generator self-excitation and subsequent loss of control if the system power factor becomes sufficiently leading.

To reduce the risks associated with the use of local capacitive filtering, systems employing active filters, such as that disclosed by U.S. Pat. No. 5,397,927 awarded to Suelzle et al. for an "Active Filter for Reducing Non-fundamental Currents and Voltages", may be used. This system requires that each of its' control signals, both voltage and current, be filtered by a notch filter to remove the fundamental frequency component of the bus waveform and leave only the harmonic and other non-fundamental frequency currents. These control signals control the generation of an injected current component proportional to these harmonic and other non-fundamental frequency currents and an injected current component proportional to the non-fundamental frequency line voltages but opposite in phase with them into the system.

The requirement of notch filtering to remove the fundamental frequency component, however, adds cost and complexity and the reduces reliability of the system. In addition, this requirement reduces the performance of the active filter itself if the frequency is allowed or is required to deviate from the tuned notch frequency of the control signal filter. A typical fixed frequency power distribution system for use on aircraft, for example, allows a 40 Hz deviation in bus voltage. Additionally, a system such as disclosed by U.S. Pat. No. 5,397,927 would have particular performance problems in variable frequency systems where the fundamental frequency of the system is allowed to vary over a range of approximately 2:1.

It is an object of the instant invention, therefore, to provide a harmonic distortion compensator for application as a local area compensation on a power generation and distribution system or as a dedicated load filter for a non-linear ac load. Further, it is an object of the instant invention to provide a harmonic distortion compensator which will operate over a wide fundamental frequency range and which will appear as a virtual no-load to the system. Additionally, it is an object of the instant invention to provide a distortion compensator or 'scrubber' which may also be used in conjunction with a low quality source to provide good power quality to the distribution loads.

SUMMARY OF THE INVENTION

An add-on distortion scrubber is described for use in an AC power generation system providing an AC voltage waveform having an undesirable harmonic content. The scrubber comprises an inverter having a first DC link capacitor coupled in parallel therewith. A series connected inductive tie impedance electrically couples the inverter in parallel with the AC power generation system. The inverter produces an output voltage having controllable magnitude, phase, and frequency components. The inverter is operates by sensing the AC voltage waveform of the AC power generation system and controlling its output magnitude, phase, and frequency to fundamentally match the AC voltage waveform. In this way, the inverter appears as a virtual no-load to the AC power generation system while removing the harmonics therefrom.

The control of the add-on distortion scrubber scales the sensed AC voltage waveform to create a DC reference voltage, senses a DC voltage across the DC link capacitor, and calculates a DC error between the two. A reference sine wave having a phase angle responsive to this DC error is generated. The real power flow into and out of the inverter is then controlled by regulating the DC voltage across the DC link capacitor by advancing the phase of the reference sine wave in response to a DC error of first polarity indicating that the DC voltage is too high. Alternatively, the phase angle of the reference sine wave is retarded in response to a DC error of a second polarity indicating that the DC voltage is too low. In this way, the scrubber inverter maintains a virtual zero real power flow into and out of the unit.

Additionally, the amplitude of the reference sine wave is scaled to allow regulation of the reactive power flow into and out of the inverter by controlling the amplitude of the inverter output to maintain a virtual zero reactive power flow into and out of the inverter. To ensure a virtual zero reactive power flow with sensing error and lifetime drift, the inverter input current is sensed and a reactive component of the inverter input current is demodulated. The reactive power flow into the inverter is then compensated by adjusting the scaling of the reference sine wave. The control of the inverter utilizes the sensed AC voltage waveform and the scaled reference waveform for generating an AC error voltage indicative of the harmonics contained within the sensed AC voltage waveform. This error is scaled combined with the scaled AC error voltage to drive the inverter to produce the inverter output.

Alternatively, as used as a dedicated load filter, the scrubber senses the total current delivered to the load and scrubber. The sensed AC voltage waveform and the sensed total load current are used to generate a smoothed average power delivered signal. This signal is divided by the sensed AC voltage waveform to generate a reference current signal which is compared to the total load current for calculating an instantaneous current error signal. The instantaneous current error is scaled and compared to the scaled reference voltage waveform to drive the inverter to operate as a dedicated load filter.

Further, with a controlled relationship of the inductive tie impedance, the add-on distortion scrubber may be utilized with a main power inverter operating in the full square wave mode generating an output AC waveform having a fundamental component and a plurality of harmonic components associated therewith. The output of the main power inverter is coupled through an output inductance to the power distribution bus and a filter capacitor is also coupled to the power distribution bus in parallel with the main power inverter. The inductive tie impedance of the add-on distortion scrubber is controlled to approximately one-third of the output inductance of the main inverter and couples the scrubber to the power distribution bus in parallel with the main power inverter. In this way, the add-on distortion scrubber is operable to provide harmonic currents to cancel the harmonic components of the main inverter's output AC waveform to reduce the total harmonic distortion present on the power distribution bus.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 2b is a waveform diagram illustrating the waveform generated by the scrubber inverter of FIG. 1 in response to the waveform of FIG. 2a;

DESCRIPTION OF THE PREFERRED EMBODIMENTS

Figure 1:
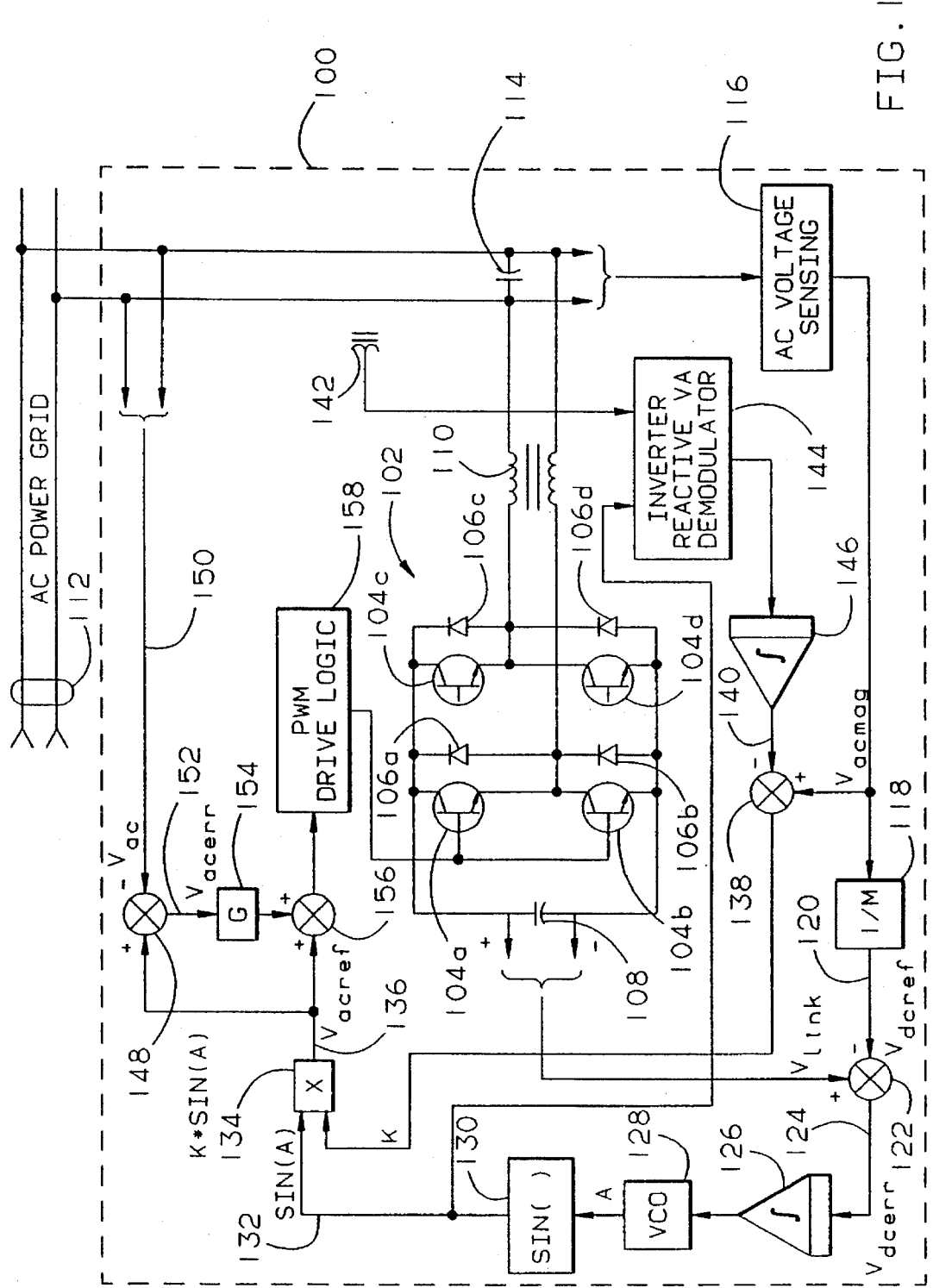
FIG. 1 is a single line schematic illustration of an embodiment of the instant invention.

In a preferred embodiment of the instant invention, as illustrated in FIG. 1, an add-on distortion scrubber 100 comprises an inverter 102 having a plurality of switches 104a–d, and a plurality of anti-parallel connected diodes 106a–d coupled thereacross. A DC link capacitor 108 is coupled in parallel with the inverter 102. The inverter is coupled through an inductive tie impedance 110 to an AC distribution bus 112, across which is coupled a filter capacitor 114. The AC voltage magnitude is sensed by AC voltage sensing means 116 and scaled by means 118 to produce a DC voltage reference on line 120. This voltage is summed by means 122 with the sensed DC voltage across the DC link capacitor 108 to generate a DC error signal on line 124. This signal is integrated by means 126 and input to a voltage controlled oscillator 128, the output of which represents the desired phase of the inverter 102 output. This phase is input to a sine function 130 which generates a sine wave reference waveform on line 132.

This reference waveform is scaled by means 134 to produce the AC voltage reference waveform on line 136. The scaling constant is the differential summation 138 of the sensed AC voltage magnitude and a signal 140 representing the actual reactive power flowing to or from the inverter 102. This signal 140 is produced by sensing the inverter current by means 142 and through means 144 demodulating the reactive power content by using the sine wave reference 132. The output from means 144 is then integrated by means 146 to produce signal 140.

The AC reference waveform on line 136 is differentially summed by means 148 with the sensed AC voltage waveform 150 on the AC distribution bus 112 to produce an AC error voltage waveform on line 152. This signal 152 is scaled by means 154 and summed by means 156 with the AC voltage reference signal on line 136 to produce the inverter drive signal to the PWM drive logic 158. This drive logic 158 controls the switches 104a–d to produce the appropriate waveform to reduce the harmonic content on the AC distribution bus 112.

The embodiment of FIG. 1 represents a power line scrubber 100 which may be connected to an AC power distribution system at any point chosen by the system designer. It can be applied to single phase or poly phase systems on single or multiple phases as needed. The size (rating) of the inverter 102 is a function of the impedance of the system, the magnitude of the offending currents, and the degree to which the power quality is to be improved. The distortion scrubber 100 utilizes a DC link inverter 102 which operates in parallel with the power distribution bus 112 and whose voltage magnitude, frequency and phase angle are controlled to fundamentally match the power grid so that the inverter 102 appears as no load, except for losses, to the system. The inverter 102 is connected to the bus through an inductive tie impedance 110. Because the tie impedance 110 is inductive, reactive power is a function of relative voltage magnitude and real power is a function of relative phase angle.

Operating power for the inverter 102 losses is derived directly form the distribution bus 112 through the tie impedance 110 by adjusting the phase angle of the inverter voltage relative to the bus voltage angle. In this way, the inverter 102 provides a means to improve the non-fundamental (harmonic) frequency components on the power distribution system. The inverter 102 has a bandwidth which is capable of generating current pulses which will effectively restore the system currents to the desired sine wave shape and lower the distortion of the distribution bus voltage. The control algorithm for the inverter 102 and the sensing/error detecting scheme can be altered to provide various types of scrubbers 100. For example, the harmonic control loop can be closed around voltage or current whichever best suits the application. Instead of a power distribution bus compensator, the system 100 could be used as a dedicated load filter by connecting it between the distribution bus 112 and a specific load 160 (see FIG. 3 ) to convert the load's high harmonic current into a current low in harmonics with a good power factor. The instant invention also provides the capability to generate reactive power (VAR generation) and so can be used to compensate undesirable system power factor conditions, leading or lagging while simultaneously reducing harmonic distortion.

In a preferred embodiment of the instant invention, an inductive paralleling reactance 110 is chosen to minimize losses. The value of the reactance 110 is generally set to be approximately 0.1 per unit impedance at fundamental frequency, where 1.0 per unit is taken to mean the rating of the scrubber 100. For example, a 5 kVA rated single phase unit at 115 Vac provides, by definition, a rated current of 43 amperes. An impedance of 0.1 per unit is then 0.26 ohms which equals 106 µH for a 400 Hz system.

The inverter 102 is a pulse width modulated (PWM) type with its modulating frequency substantially higher than the distribution bus 112 frequency. A capacitor stage of filtering 114 may be needed to keep the modulation (carrier) frequency from reaching the distribution bus 112. The value of the capacitor 114 is a function of the PWM carrier frequency, larger frequency requires less capacitance. This filter 114 will also serve to compensate distortion frequencies on the distribution bus 112 which are beyond the bandwidth of the active filter (inverter 102), thus giving a broad frequency band of coverage.

The scrubber 100 cannot generate steady state real power, however, it can provide real power pulses as needed to effectively smooth the total continuous, real power from the distribution bus 112 in an amount equal to the losses in the inverter 102 plus the control circuit losses. Real power flow from the inverter 102 will deplete the charge on the DC link capacitor 108, whereas power flow into the inverter 102 will increase its charge. Thus, the phase angle control loop is closed around the inverter's DC link voltage such that the link voltage is regulated to a reference value through angle control. A very slight lagging phase angle of the inverter's fundamental voltage will provide the necessary real power for inverter losses, etc. The magnitude of the DC link reference 120 is relatively constant and is determined by distribution bus voltage and the desired modulation index which the inverter 102 is programmed to operate.

Reactive power flow (VARs) is controlled through the relative amplitude of the inverter's internal voltage. An internal voltage amplitude which is too large generates lagging VARs whereas too low will generate leading VARs. Thus the inverter internal fundamental voltage amplitude control loop is closed around the reactive VA such that the VARs are regulated to a reference value. The VAR reference point can be either the inverter's contribution to the bus 112 or the total VARs or a dedicated load's VARs depending on the desired application. The VAR controller is generally set to drive the inverter contribution to zero.

As can be seen from the above discussion, the scrubber 100 is, in many respects, similar to an unloaded synchronous motor connected to an AC power grid. The motor's inductive reactance is equivalent to the tie reactance 110 which connects its back EMF to the distribution bus 112. The rotor lags sufficiently in phase angle to provide make up power for all losses in the machine, i.e. windage, copper and iron losses, whereas the level of field excitation will determine its back EMF and resultant VAR generation: leading, lagging, or zero. The scrubber 100 of the instant invention, however, has the added capability of instantaneous waveform control which will permit it to actively compensate disturbances in the waveform or fill in missing current segments created by nonlinear loads (not shown).

As stated above, the scrubber 100 comprises the transistor/diode bridge (inverter 102), the link capacitor 108, the tie reactance 110 and the filter capacitor 114. The drive logic 158 far the inverter transistors 104a–c is a pulse width modulated (PWM) design, such as a conventional sine-triangle crossover technique. This approach is good because it is compatible with linear feedback techniques. The inverter 102 needs to run at a modulation index (M) of less than unity, typically 0.8 or 80%. This will provide 20% to 25% extra forcing voltage near the peak (worst case point) to assure that current is available over the full voltage cycle. This 20% voltage across the 0.1 per unit impedance tie reactance 110 means that a minimum of 200% or 2.0 per unit current forcing current is available for waveform correction.

The link voltage ultimately determines the modulation index at which the proposed system runs. Regulation of the link is accomplished in FIG. 1 by the link voltage loop comprising the AC voltage sensing 116, the link summing junction 122 and associated components. Generally, for a single phase 115 Vac system, a modulation index of 1.0 requires a link voltage of 165 Vdc, whereas for M=0.8 a link voltage of approximately 210 Vdc is required. The Vdcref signal 120 will provide a fixed modulation index level of M=0.8 by virtue of the AC voltage sensing circuit 116 and the scaling constant 118 of 1/M in FIG. 1. The link voltage summing junction 122 will provide an error voltage Vdcerr 124 of proper polarity so that if the link voltage is too high (positive error) the voltage controlled oscillator (VCO) 128 will increase the inverter's phase angle (A) which will cause the inverter 102 to deliver more real power and reduce the charge and voltage on the link filter capacitor 108. Conversely, a too low link voltage will be corrected by slightly retarding the inverter phase single. In this manner the DC link voltage is continuously regulated to the desired level.

In order for the inverter 102 to ride along on the distribution bus 112 but remain a virtual no-load (real or reactive) requires that both phase angle and amplitude of the inverter voltage be controlled. The integrator 126, VCO 128 and SIN(A) functions 130 along with the link error detector 122 provides the angle part of the requirements as described above. The desired inverter AC voltage amplitude is the distribution bus voltage amplitude which is provided from the AC voltage sensing function 116 and is used to scale the SIN(A) 132 by the multiplier functional block 134. At this point the AC voltage reference (Vacref) 136 is the approximately the correct sine function in terms of both amplitude and phase angle.

Small errors in the amplitude sensing circuit 116 will, however, be manifested in substantial reactive currents. For example, a 1% voltage error will create a 10% reactive current if a 0.1 per unit tie inductance 110 is used. To compensate for set point errors and lifetime drift, a reactive current detection circuit 144 is used to determine the inverter's reactive VA contribution. In FIG. 1, it is assumed that the contribution is to be zero. The reactive current signal is integrated 146 and summed 138 with the AC system voltage signal to create the final magnitude value "K". The AC voltage reference (Vacref=K*SIN(A)) 136 is now the perfect reference signal to assure that the inverter 102 is transparent to the power grid 112. The pulse width modulator (PWM) 158 converts this reference into the proper transistor drive signals for the inverter 102.

The AC reference signal 136 can now be modified with feedback to provide the desired harmonic reduction and power factor improvement to the system. The actual grid voltage 150 is compared to the Vacref signal 136 by the summing junction 148 such that deviations form ideal are determined on an instantaneous basis. The resulting signal (Vacerr) 152 is amplified 154 and applied to the inverter in the appropriate sign 156 to drive the system voltage toward the desired ideal sine wave reference. Larger gains 154 will produce less error.

Figure 2A:
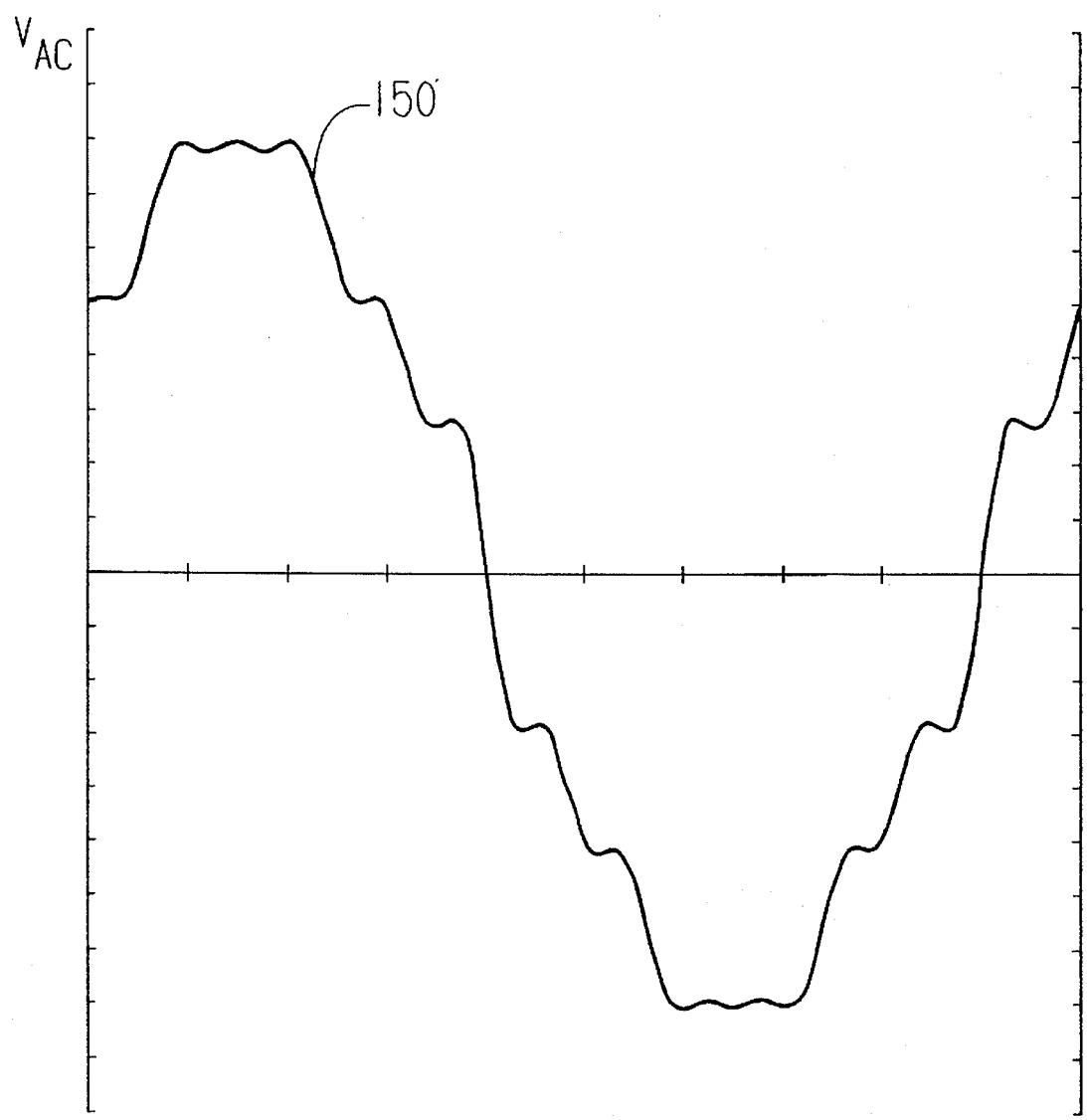
FIG. 2a is a waveform diagram illustrating an AC waveform containing substantial harmonics present on the AC distribution bus of FIG. 1.
Figure 2B:
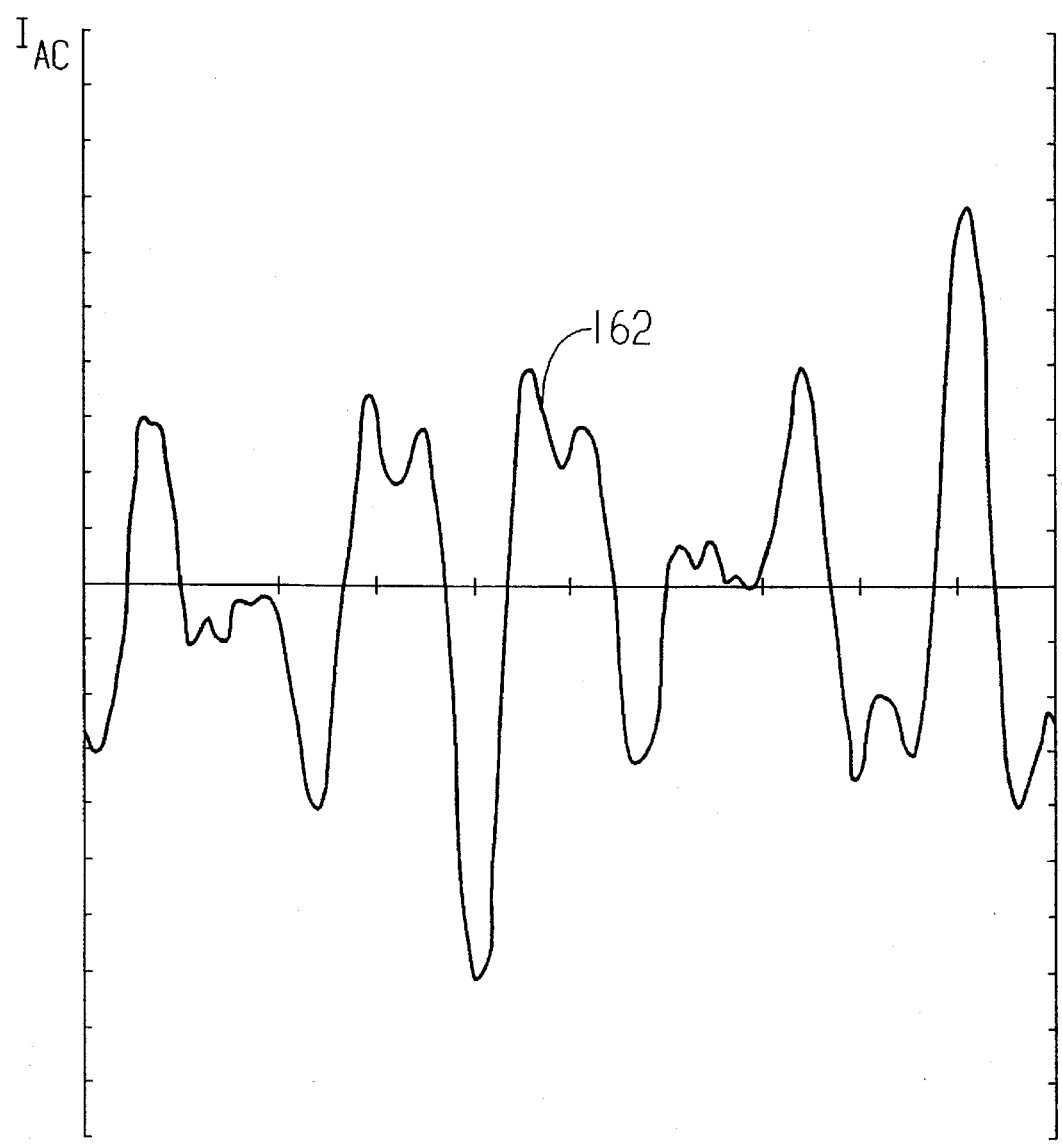
Figure 2C:
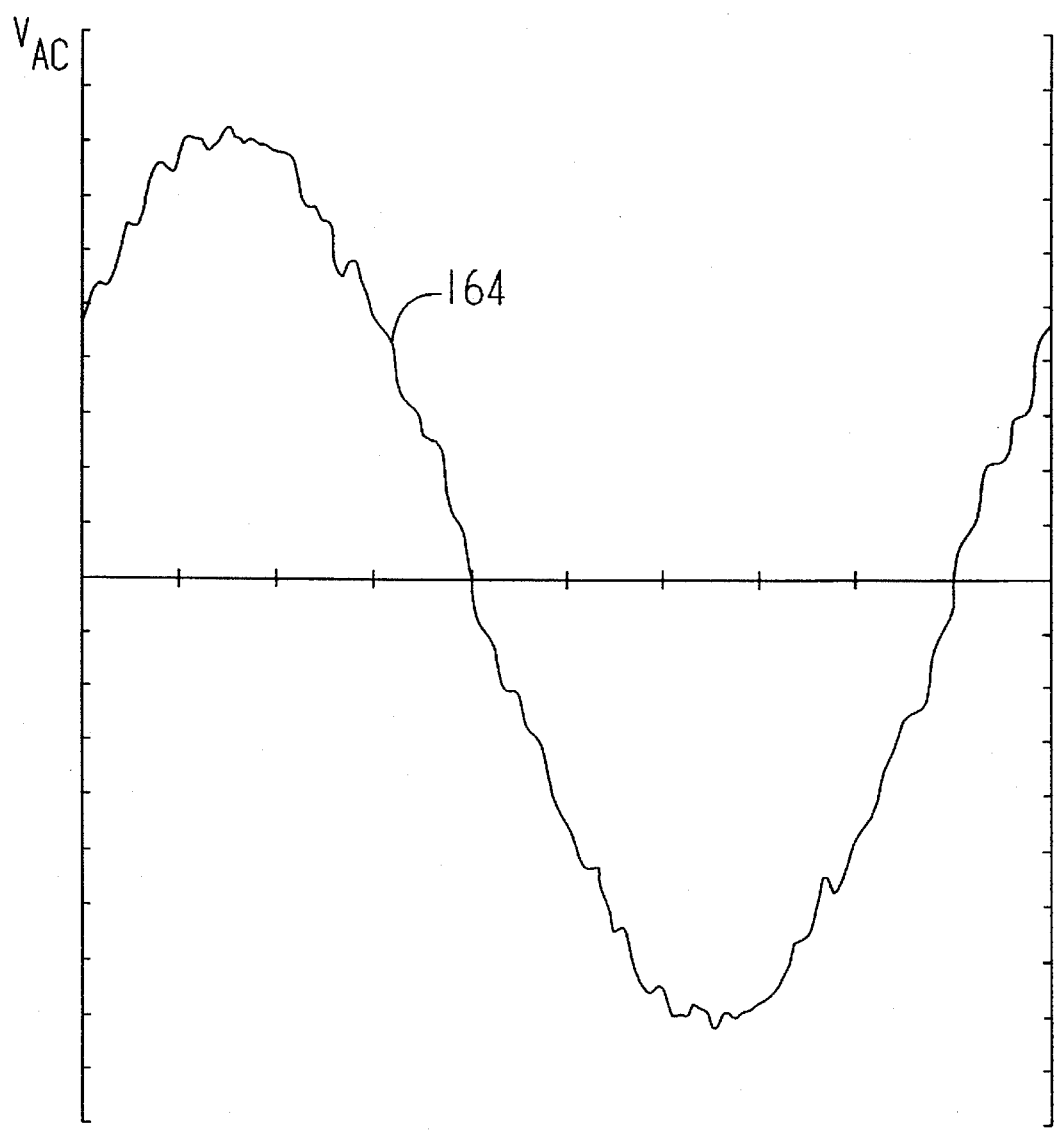
FIG. 2c is a waveform diagram illustrating the resulting AC waveform present on the AC distribution bus of FIG. 1 after the generation of the waveform of FIG. 2b.

The result is that the scrubber 100 will effectively fill in the notches (harmonics, etc.) in the grid's current waveforms and thereby reduce the voltage distortion. As illustrated in FIG. 2A, the actual grid voltage 150 contains substantial distortion before operation of the scrubber 100. The scrubber 100 operates as described above to generate a current waveform 162 to reduce the harmonic content of the voltage present on the distribution bus 112. The resultant grid voltage 164 is illustrated in FIG. 2C. To accomplish this harmonic reduction, the inverter 102 needs a rating which can accommodate the power associated with the disturbance on the system. This, in turn, is a function of the non-linear loads on the power grid 112, not the power grid rating. For example, a multi-megawatt power grid may have only 10 kW of disturbing non-linear load at a given point in the grid. If, of that 10 kW load, only 2 kVA of harmonics are produced, then a 2 kVA rated scrubber will suffice for this application. The physically closer the scrubber is placed to the load tap on the grid, the better the entire system distortion improvement will be.

Figure 3:
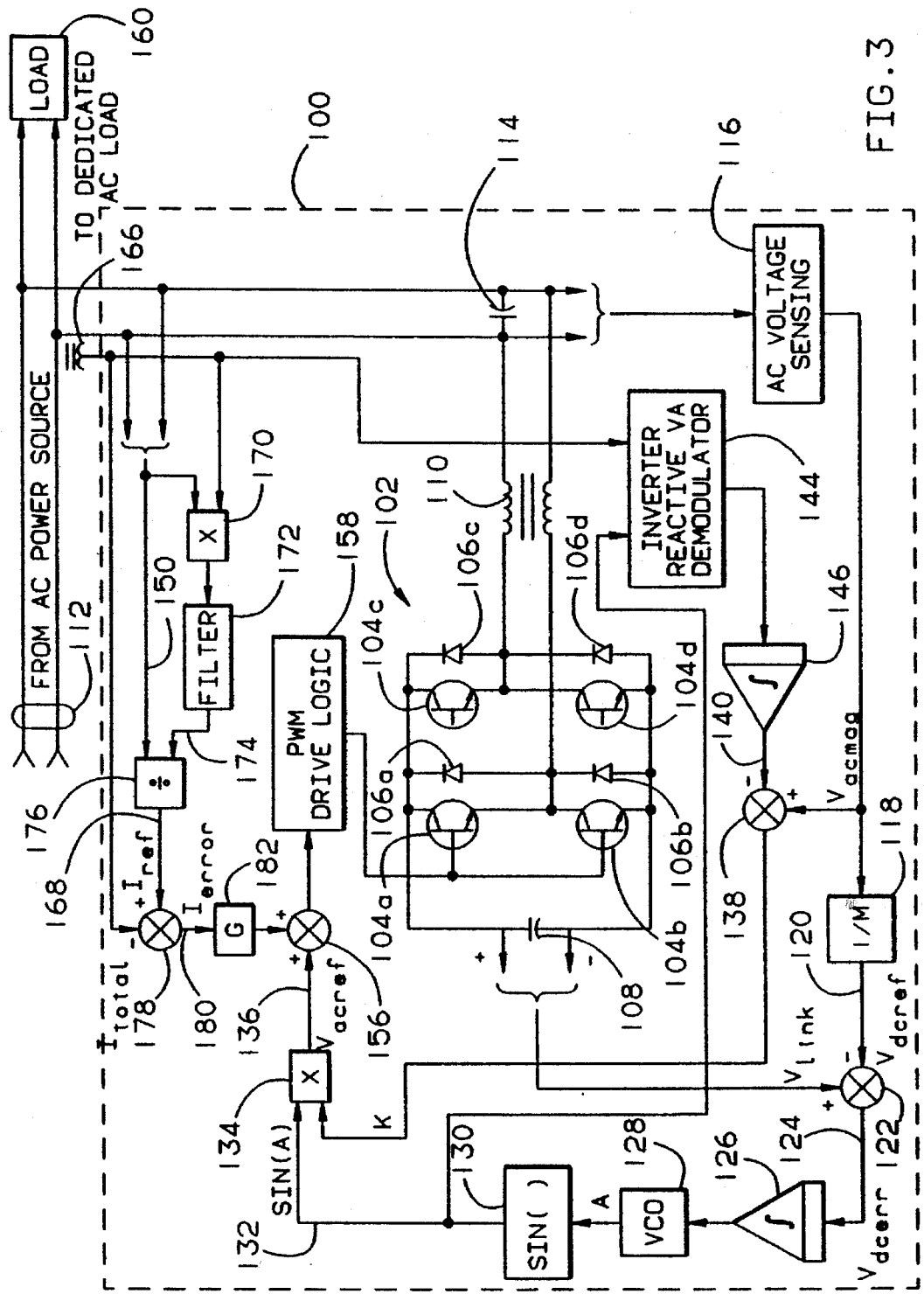
FIG. 3 is a single line schematic illustration of an alternate embodiment of the instant invention.

FIG. 3 illustrates an alternate embodiment of the instant invention. In this embodiment the scrubber 100 is used as a dedicated load filter. The inverter 102 again tags along on the power line 112 as a virtual non-load through the dc link voltage regulation scheme and the reactive VA generation control loop as described above. The controlled reactive current is, in this case, the combined load and inverter reactive current and it is sensed by means 166 upstream of the scrubber 100 accordingly (Itotal). Thus the total load power factor angle (displacement angle) is controlled to zero. In order to cancel harmonic currents generated by the dedicated load 160, a reference current 168 must be generated. There are various ways to accomplish this, but all approaches essentially need to produce a pure sine wave (or nearly so) which directly corresponds to the real power consumed by the load 160. This current will vary in accordance with input voltage drifts, etc.

The circuit in FIG. 3 multiplies 170 the instantaneous load current as sensed by means 166 and voltage 150 together and smooths this instantaneous power through a low pass filter 172. The resulting average power on line 174 is then divided 176 by the load voltage 150 giving the desired current reference 168. Since the current will be of the same basic signature of the voltage, it represents a resistive or unity power factor load as desired. This reference current 168 is compared with the actual current as sensed by means 166 at the summing junction 178. The resulting error current signal on line 180 is scaled 182 and added 156 to the AC voltage reference signal to control the PWM drive logic 156. The end result is that the scrubber 100 will effectively fill in the notches (harmonics, etc.) in the load's current waveform and thereby reduce the voltage distortion. Thus the inverter portion will need a rating which can accommodate the VA associated with the load's current distortion. The power factor presented to the power source (not shown) will be unity, which is a definite advantage over other filtering techniques.

Figure 4:
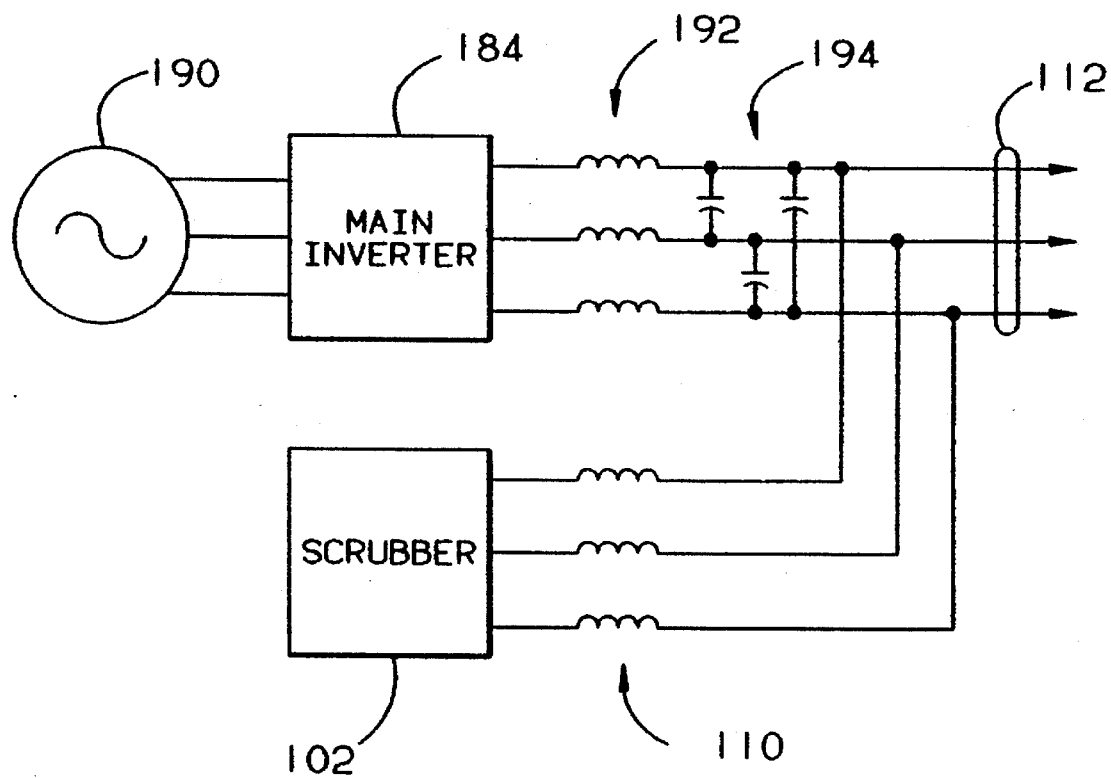
FIG. 4 is a single line block diagram illustration of a further alternate embodiment of the instant invention.
Figure 5:
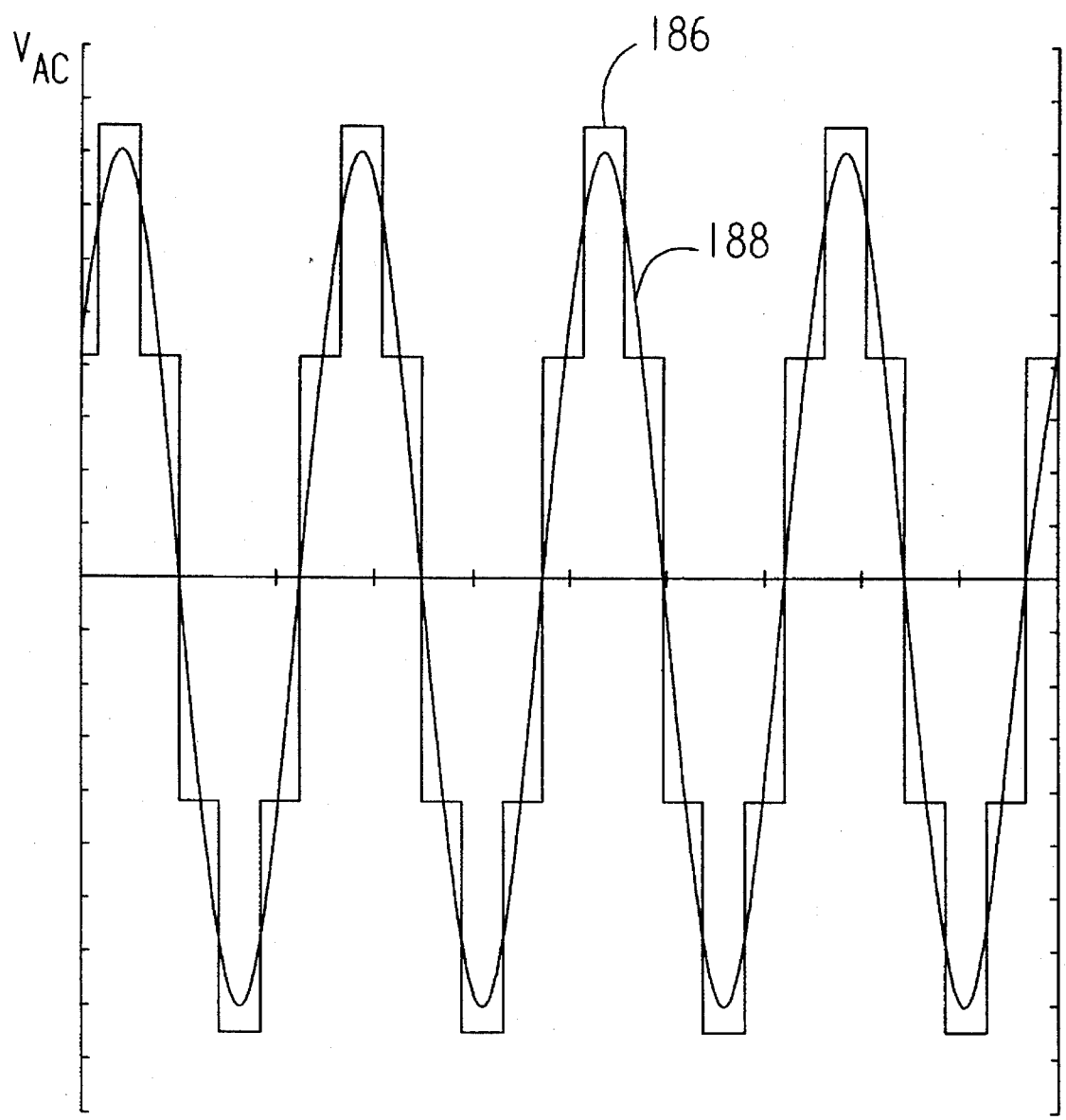
FIG. 5 is a waveform diagram illustrating an output waveform from the main inverter of FIG. 4 superimposed on the corrected waveform resulting from operation of the scrubber inverter of FIG. 4.

The scrubber 100 of the instant invention is particularly useful in applications on aircraft. In aircraft electric power generation and distribution systems the total system impedance is relatively high, and the scrubber 100 may be used to maintain good power quality on the bus 112 (low distortion) which would otherwise be quite poor in the presence of nonlinear loads. Because of this relatively high system impedance, the scrubber 100 may be used in conjunction with a "low quality" power source 184 to provide high quality power as illustrated in FIG. 4. Specifically, the primary source may be a simple and low cost inverter 184 supplied by generator 190 and operating in the full square wave mode with attendant harmonics normally not desired or allowed on the power bus 112 (see FIG. 5, waveform 186). The scrubber 102 operates in conjunction with this first inverter 184 to provide the necessary harmonic currents to keep the bus voltage within desired power quality limits (see FIG. 5, waveform 188).

This arrangement of power generation is advantageous because, in addition to the cost and complexity reduction of the main inverter 184, the scrubber 100 would only need to be a fraction of the rating of the main inverter 184, typically only one third the rating. The switching losses in the system are also reduced because only the scrubber 102, which operates at substantially lower currents than the main inverter 184, switches at frequencies required for harmonic cancellation. The switching frequency of the main inverter 184 is at the fundamental frequency, i.e. 400 Hz for a typical aircraft power system. Thus, the main inverter 184 can be optimized for cost and efficiency by designing it with low cost and low forward drop switches (not shown). The control logic for the main inverter 184 would be quite simple in function and, therefore, low cost. Additionally, since the scrubber 102 is tied to the distribution bus 112 through a higher impedance 110, typically 3 times the main inverter impedance 192, the undesirable switching frequency harmonics are substantially reduced on the AC output voltage resulting in improved electro-magnetic interference (EMI) and power quality performance. The arrangement of FIG. 4 also allows the voltage regulation of the final output to be performed by the scrubber 102 by supplying the reactive power to the system necessary to compensate for the voltage drop across the main inverter inductor 192.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive rights in all modifications which come within the scope of the appended claims is reserved.

I claim:

1. An add-on distortion scrubber for use in an AC power generation system, the system generating an AC voltage waveform having harmonics therein, comprising:

an inverter having a first DC link capacitor coupled in parallel therewith;

a series Connected inductive tie impedance electrically coupling said inverter in parallel with the AC power generation system; and first means for controlling said inverter to produce an output voltage having magnitude, phase, and frequency components associated therewith, said first means sensing the AC voltage waveform of the AC power generation system and controlling said magnitude, said phase, and said frequency of said inverter output to fundamentally match the AC voltage waveform, said inverter appearing as a virtual no-load to the AC power generation system thereby and removing the harmonics therefrom.

2. The add-on distortion scrubber of claim 1, wherein said first means comprises:

second means for scaling said sensed AC voltage waveform to create a DC reference voltage;

third means for sensing a DC voltage across said first DC link capacitor;

fourth means for calculating a DC error between said DC voltage and said DC reference voltage;

fifth means for generating a reference sine wave having a phase angle responsive to said DC error, said fifth means controlling said real power flow into and out of said inverter by regulating said DC voltage across said DC link capacitor by advancing said phase of said reference sine wave in response to a DC error of first polarity indicating said DC voltage is too high, said fifth means retarding said phase of said reference sine wave in response to a DC error of second polarity indicating said DC voltage is too low, said fifth means maintaining a virtual zero real power flow into and out of said inverter thereby.

3. The add-on distortion scrubber of claim 2, wherein said first means further comprises sixth means for scaling said reference sine wave to regulate reactive power flow into and out of said inverter by controlling said amplitude of said inverter output, said sixth means generating a scaled reference sine wave and maintaining a virtual zero reactive power flow into and out of said inverter thereby.

4. The add-on distortion scrubber of claim 3, wherein said first means further comprises:

current sensing means for sensing inverter input current, said current sensing means generating an inverter input current sense signal;

seventh means coupled to said current sensing means for demodulating a reactive component of said inverter input current; and eighth means coupled to said seventh means and operable on said sixth means for compensating reactive power flow into and out of said inverter by adjusting said scaling of said reference sine wave.

5. The add-on distortion scrubber of claim 4, wherein said first means further comprises:

ninth means operable with said sensed AC voltage waveform and said scaled reference waveform for generating an AC error voltage indicative of the harmonics contained within said sensed AC voltage waveform;

tenth means coupled to said ninth means for scaling said AC error voltage, said tenth means generating a scaled AC error voltage thereby;

eleventh means for combining said scaled AC error voltage and said scaled reference waveform, said eleventh means generating a modified reference waveform thereby; and twelfth means operable from said modified reference waveform for driving said inverter to produce said inverter output.

6. The add-on distortion scrubber of claim 3, wherein said first means further comprises:

current sensing means for sensing combined inverter and load current, said current sensing means generating a total load current sense signal;

seventh means coupled to said current sensing means for demodulating a reactive component of said total load current; and eighth means coupled to said seventh means and operable on said sixth means for compensating reactive power flow to and from system loads and into and out of said inverter by adjusting said scaling of said reference sine wave.

7. The add-on distortion scrubber of claim 6, wherein said first means further comprises:

thirteenth means responsive to said sensed AC voltage waveform and said total load current sense signal for generating a smoothed average power delivered signal;

fourteenth means responsive to said smoothed average power delivered signal and said sensed AC voltage waveform for generating a reference current signal;

fifteenth means responsive to said reference current signal and said total load current sense signal for calculating an instantaneous current error signal;

sixteenth means coupled to said fifteenth means for converting said instantaneous current error signal into a scaled AC error voltage;

eleventh means for combining said scaled AC error voltage and said scaled reference waveform, said eleventh means generating a modified reference waveform thereby; and twelfth means operable from said modified reference waveform for driving said inverter to produce said inverter output, said inverter operating as a dedicated load filter thereby.

8. The add-on distortion scrubber of claim 1, wherein said inverter is rated at 1.0 per unit, and wherein said series connected inductive tie impedance is sized at approximately 0.1 per unit impedance at fundamental frequency.

9. The add-on distortion scrubber of claim 1, wherein said first means operates said inverter at a modulation index of less than unity.

10. The add-on distortion scrubber of claim 9, wherein said modulation index is approximately 0.8.

11. The add-on distortion scrubber of claim 2, wherein said second means utilizes a scaling factor to provide a fixed modulation index of 0.8.

12. A method of controlling an add-on distortion scrubber having a DC capacitor coupled thereacross, the add-on distortion scrubber being coupled through an inductive tie impedance in parallel with an AC power distribution system generating an AC voltage, the method controls the add-on distortion scrubber to remove harmonics present in the AC voltage, comprising the steps of:

pulse width modulating the add-on distortion scrubber based on a reference waveform to generate an output voltage waveform fundamentally matching the AC voltage of the AC power distribution system;

controlling phase angle of said reference waveform to minimize real power flow into and out of the add-on distortion scrubber;

controlling amplitude of said reference waveform to minimize reactive power flow into and out of the add-on distortion scrubber; and comparing the AC voltage of the AC power distribution system with said reference waveform to produce an error signal to be combined with said reference waveform for use in said pulse width modulating step to reduce harmonic content in the AC voltage of the AC power distribution system.

13. The method of claim 12, wherein the step of controlling phase angle of said reference waveform comprises the steps of:

sensing the AC voltage to produce an AC voltage magnitude sense signal;

scaling said AC voltage magnitude sense signal to produce a DC reference signal;

sensing a DC voltage across the DC capacitor to produce a DC sense signal;

comparing said DC reference signal with said DC sense signal to determine a DC error voltage therebetween; and advancing said phase angle of said reference waveform in response to a DC error voltage of a first polarity and retarding said phase angle of said reference waveform in response to a DC error voltage of a second polarity.

14. The method of claim 12, wherein the step of controlling amplitude of said reference waveform comprises the steps of:

sensing the AC voltage to produce an AC voltage magnitude sense signal;

multiplying said reference waveform by said AC voltage magnitude sense signal.

15. The method of claim 14, further comprising the steps of:

sensing AC current flowing into and out of the add-on distortion scrubber to produce an AC current sense signal;

demodulating a reactive component of said AC current sense signal to determine actual reactive power flow into and out of the add-on distortion scrubber;

integrating said actual reactive power to produce a reactive power error signal; and subtracting said reactive power error signal from said AC voltage magnitude sense signal prior to said step of multiplying said reference waveform by said AC voltage magnitude sense signal.

16. An electric power generating system, comprising:

a source of electric power;

a main power inverter coupled to said source of electric power and operable to generate an output AC waveform having a fundamental component and a first plurality of harmonic components associated therewith, said main power inverter having a first output inductance coupling said output AC waveform to a power distribution bus;

a filter capacitor coupled to said power distribution bus in parallel with said main power inverter;

an add-on distortion scrubber having a second output inductance approximately one-third said first output inductance coupled to said power distribution bus in parallel with said main power inverter, said add-on distortion scrubber operable to provide a second plurality of harmonic currents to cancel said first plurality of harmonic components of said output AC waveform, said add-on distortion scrubber reducing total harmonic distortion present on said power distribution bus thereby.

17. The electric power generating system of claim 16, wherein said main power inverter operates with a switching frequency of said output AC waveform fundamental, and wherein said output AC waveform is a full square wave.

* * * * *